(12) United States Patent
Gaarden et al.

(10) Patent No.: US 7,677,385 B2
(45) Date of Patent: Mar. 16, 2010

(54) PRE-SCRAPER FOR A CONVEYOR BELT

(75) Inventors: Kjell Arne Gaarden, Herøya (NO); Kenneth Hovstø, Porsgrunn (NO)

(73) Assignee: AS Techno-Track, Porsgrunn (NO)

( * ) Notice: Subject to any disclaimer, the term of this patent is extended or adjusted under 35 U.S.C. 154(b) by 481 days.

(21) Appl. No.: 10/581,190

(22) PCT Filed: Dec. 1, 2004

(86) PCT No.: PCT/NO2004/000370

§ 371 (c)(1), (2), (4) Date: Apr. 10, 2007

(87) PCT Pub. No.: WO2005/054094

PCT Pub. Date: Jun. 16, 2005

(65) Prior Publication Data

US 2007/0272518 A1 Nov. 29, 2007

(30) Foreign Application Priority Data

Dec. 1, 2003 (NO) .................................. 20035356

(51) Int. Cl. *B65G 45/16* (2006.01)
(52) U.S. Cl. ...................................... 198/499
(58) Field of Classification Search ................. 198/497, 198/499
See application file for complete search history.

(56) References Cited

U.S. PATENT DOCUMENTS

| 4,105,109 A | * | 8/1978 | Schultz | 198/499 |
|---|---|---|---|---|
| 5,213,197 A | | 5/1993 | Mohri | |
| 5,339,947 A | | 8/1994 | Campanile | |
| 5,344,000 A | * | 9/1994 | Gleason | 198/499 |
| 5,722,528 A | * | 3/1998 | Dolan | 198/499 |
| 5,845,761 A | | 12/1998 | Davidts et al. | |
| 6,152,290 A | * | 11/2000 | Mott et al. | 198/499 |
| 6,695,123 B2 | * | 2/2004 | Stoll | 198/499 |

FOREIGN PATENT DOCUMENTS

| EP | 0 338 118 A1 | 10/1989 |
|---|---|---|
| EP | 1 065 158 A1 | 1/2001 |

* cited by examiner

*Primary Examiner*—James R Bidwell
(74) *Attorney, Agent, or Firm*—Finnegan, Henderson, Farabow, Garrett & Dunner, L.L.P.

(57) ABSTRACT

A cleaning device for a conveyor belt for installation essentially transverse to the longitudinal direction of the conveyor belt. The cleaning device comprises a supporting structure (3) adapted to hold the cleaning device in place transverse to the conveyor belt (2), the cleaning device covering essentially the whole width of the conveyor belt (2) and consisting of a plurality of individual scraper segments (1'), each of which consists of a body having a scraping face (4), which scraping face (4) rests against the conveyor belt (2). The scraping face (4) on each of the segments (1') is elastically connected to the supporting structure (3), the number of segments (1') is relatively great and all the segments are covered by a flexible material.

39 Claims, 7 Drawing Sheets

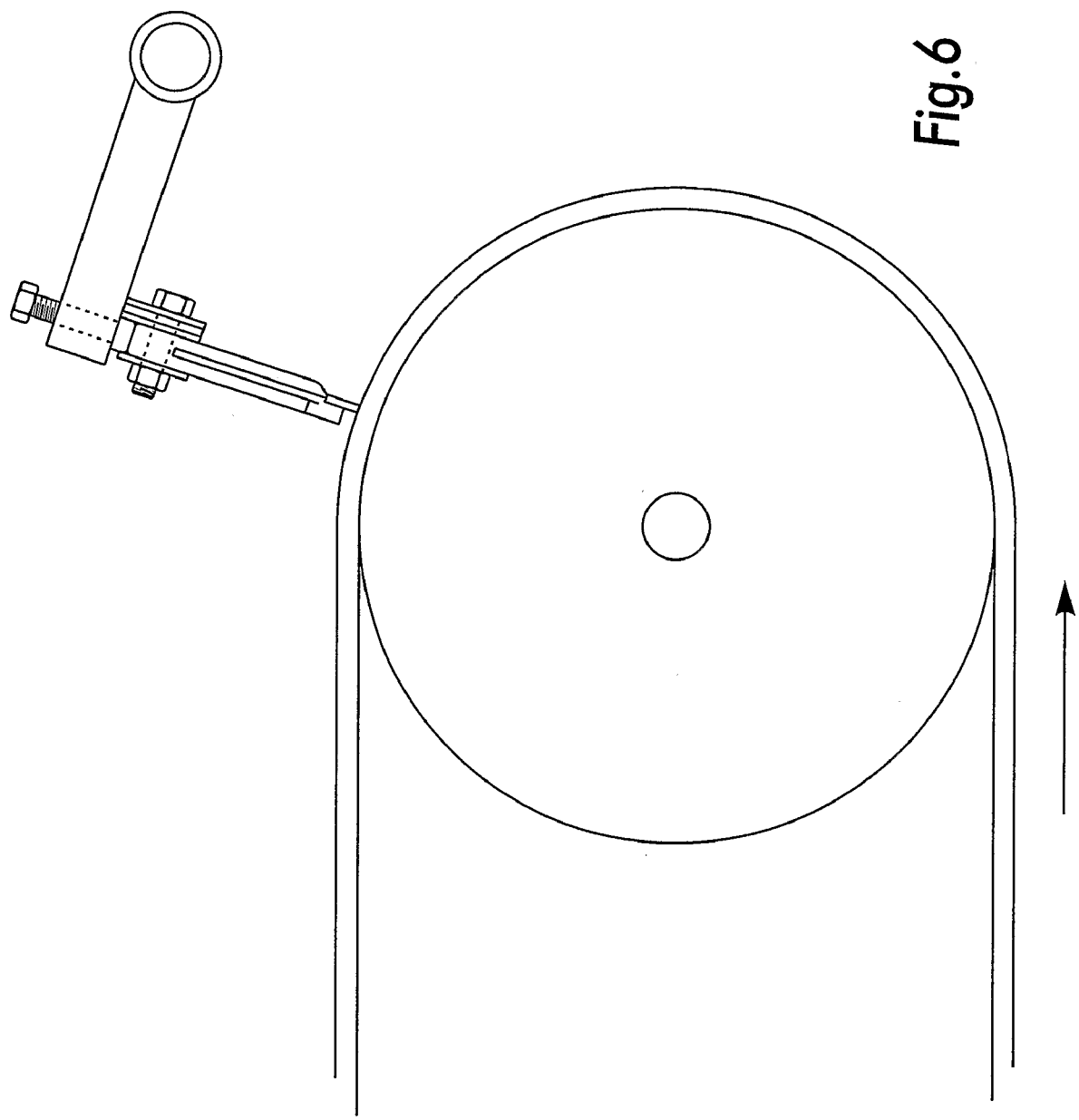

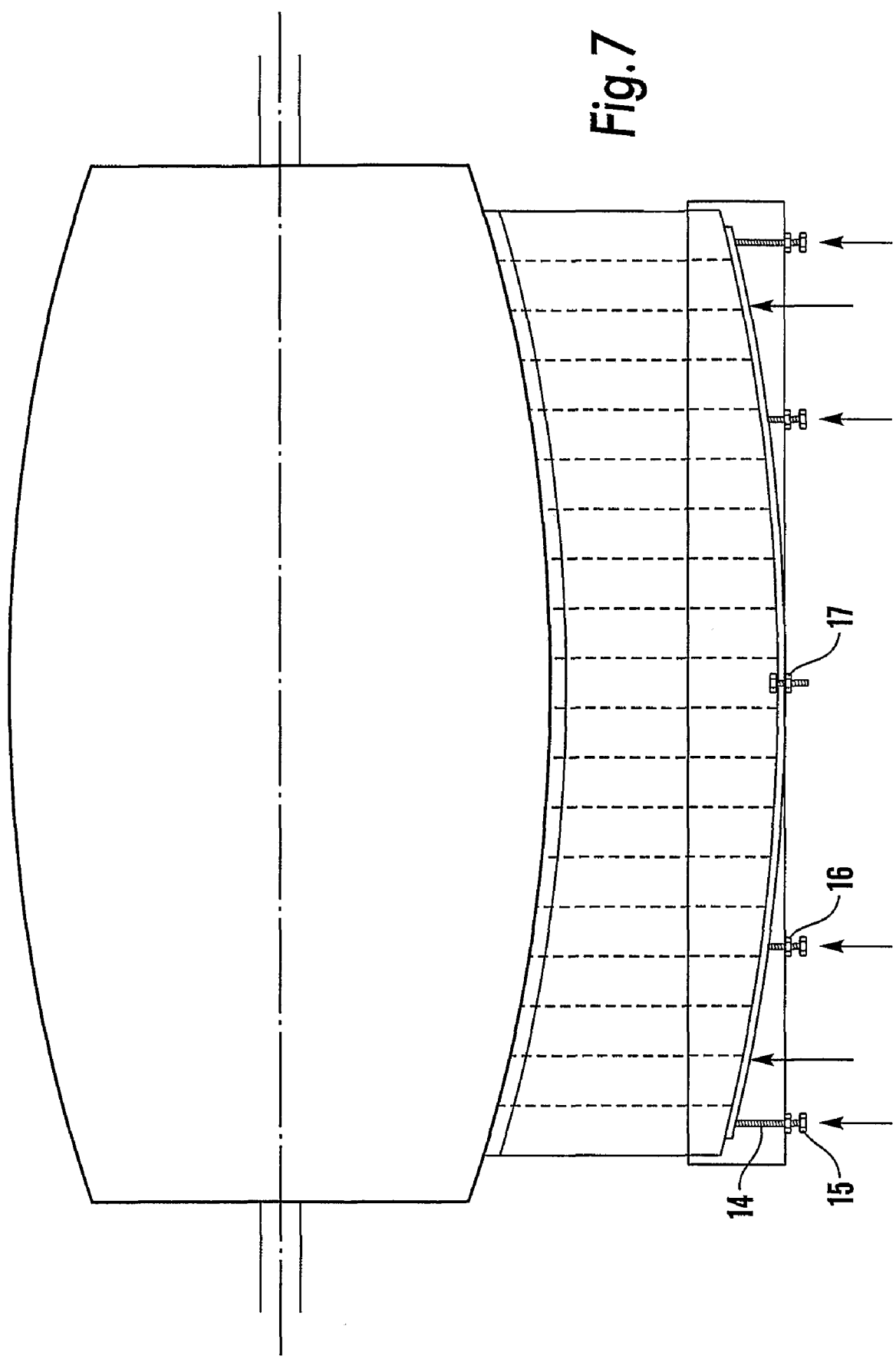

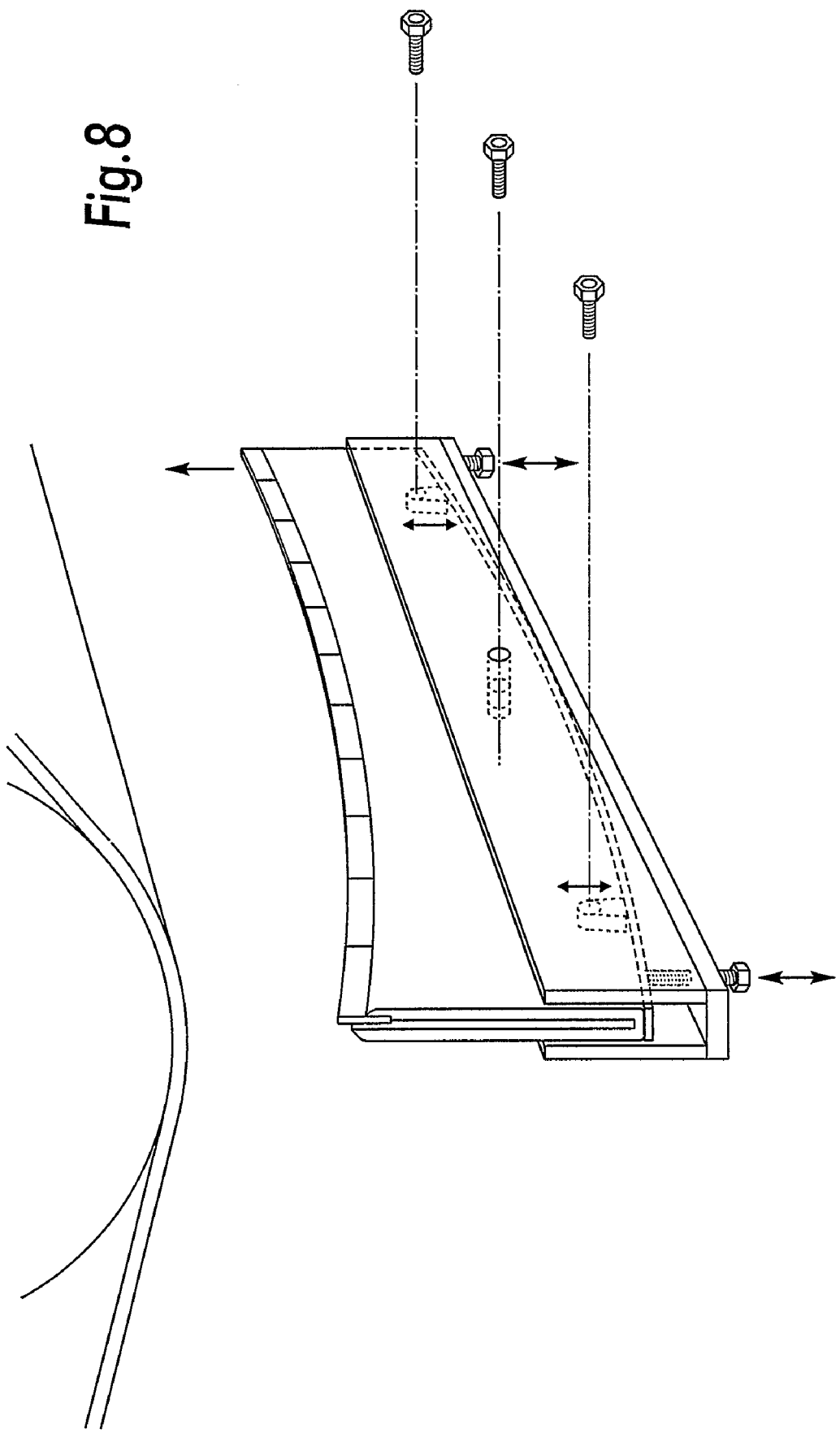

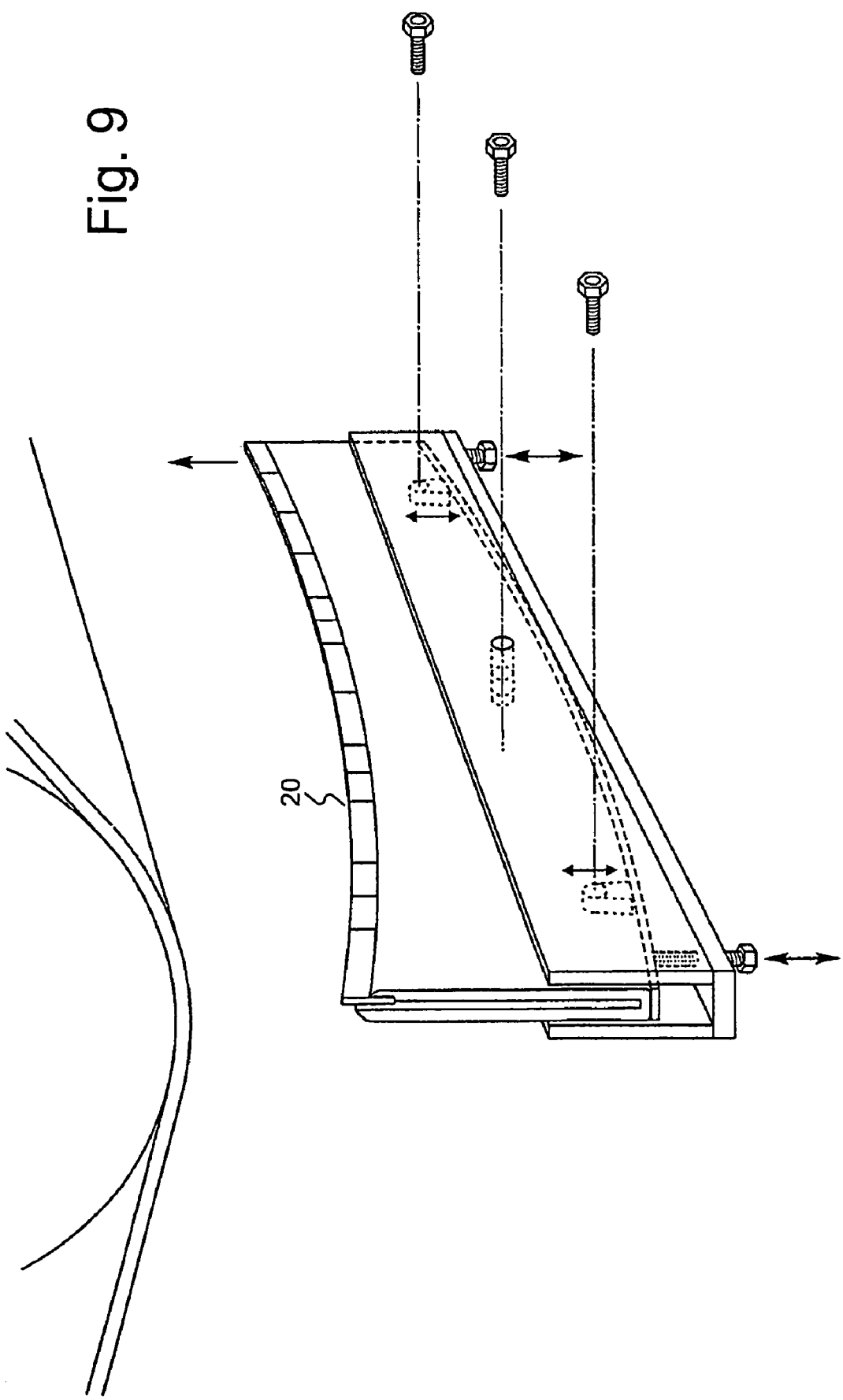

PRE-SCRAPER FOR A CONVEYOR BELT

The present invention relates to a cleaning device for a conveyor belt in a conveyor, and, more particularly, to a pre-scraper.

When conveyor belts are utilised for the transport of material, chiefly bulk material, belt cleaning devices are used across the conveyor belt to remove material remaining on the belt. Such cleaning devices may be installed at several points along a belt. A so-called fine cleaner requires space, in particular on the underside of the belt, which often is inaccessible. The solution, therefore, is to use a so-called pre-scraper. This belt scraper is usually located at a drum and frequently it is installed at end drums. However, there is often little space available in the proximity to such drums for installation and also little space for maintenance of such belt scrapers.

Such cleaning devices are found in various forms adapted to both the type of belt and the type of material. At the end of the belt in conveyors there is an end drum. Such drums are in many cases curved, which requires the scraper to be adapted to the form of the drum and also to the form of the belt at the point where it runs over the drum.

A good belt cleaning device in addition provides uniform pressure against the belt in the contact face between the belt and the scraper. Uniform pressure in this case means that ideally pressure should also be distributed uniformly across the width of the scraper as well as being uniform in time, i.e., constant pressure against the belt. In many cases, especially when a belt cleaning device consists of several segments placed side by side across the belt, and where the belt runs over a curved drum, each individual segment must be adapted and its position adjusted so that the pressure against the belt is precise and uniform for each segment. At the same time, the horizontal and vertical angular position of each segment must be correct in relation to the form of the belt over the drum.

Today, such adaptation of belt scrapers is done in different ways and with differing degrees of success. In this connection, it is not uncommon that as much as 4% of all belt scrapers or cleaning devices cause belt failure of the conveyor belt. This often happens because sharp corners on parts of a cleaning device cut into the conveyor belt (which is often a reinforced mixture of fabric and/or rubber/polymer). This applies especially in the case of the scrapers which consist of several individual segments placed side by side. Belt failure may occur in particular as a result of a corner of one of the segments becoming caught in an already damaged area of the belt, or because such a corner, which is usually sharp, makes a tear or cut in the conveyor belt which later develops into a belt breakage, for example, because of other stresses on the belt.

The problems associated with existing belt scrapers consisting of several segments lying side by side are therefore that:

The segments exert uneven pressure as they must almost continuously be adjusted and come out of position and do not remain at a constant angle to the belt during operation. This worsens if the number of segments is great, i.e., that the segments are narrow, whereupon the need for maintenance increases. This in turn is in conflict with the desire to have as many segments as possible in order to obtain as uniform a pressure and scraping effect as possible distributed across the width of the belt.

A greater number of segments, which is desirable in order to provide uniform pressure, creates more corners which might damage the belt and which therefore are an operational hazard. Moreover, each individual segment must be adjusted to adapt the scraper to the form of the belt.

It is also difficult to adapt the form of the scraper to the form of the belt transverse to the longitudinal direction of the belt, especially when the belt runs over a curved drum. This is due primarily to the fact that the segments are wide and rather inflexible and only provide contact across a small area.

If the segments are sprung, i.e. mounted elastically, and thus are self-adjusting with respect to their position and their pressure in the longitudinal direction of the belt, this will result in an uneven pressure across the contact surface where average pressure across the surface may be adequate but at certain points the pressure may be excessive, in part because of poor conformity between the form of the belt and the form of the scraper segment.

It is therefore an object of the present invention to provide a conveyor belt cleaning device, in particular in connection with a curved drum, but also elsewhere, which cleaning device has a form that easily adapts to the form of the belt transverse to the longitudinal direction of the belt, i.e., is constructed of a relatively large number of segments placed side by side.

It is also an object that the number of corners should be reduced to a minimum and preferably eliminated completely. This means that the segments, and especially the corners, must be covered, and that the segments take up an angle relative to the longitudinal direction of the belt which reduces the risk of the belt surface being exposed to the segment corners.

It is an object that it should not be necessary to adjust each segment to the curved form, which implies that the attachment must be sprung or elastic.

Based on the aforementioned problem areas, there is, therefore, in accordance with the present invention provided a conveyor belt cleaning device for installation essentially transverse to the longitudinal direction of the conveyor belt, which cleaning device comprises a supporting structure adapted to hold the cleaning device in place across the conveyor belt. According to the invention, the cleaning device of the present invention covers essentially the whole width of the conveyor belt. Thus, an installer or maintenance supervisor will perceive the cleaning device as a simple structural element, an element which does not require individual adjustment of smaller elements or segments. The cleaning device consists of a large number of individual scraper segments. Thus, the cleaning device will be easily adaptable to the form of the belt across the width of the belt. Each scraper segment also consists of a body having a scraping face, which scraping face rests against the conveyor belt. The invention is characterised by the combination of all the features that are set forth in the independent patent claims below, where each of the structural features is directed towards a particular problem area and object, and together these features form an inventive unit which in use has advantages beyond what could be expected when the advantages of the individual features are added together. In particular, the invention is characterised in that the scraping face of each of the segments is elastically attached to the supporting structure. This elastic attachment may be made via an elastic body between the scraping face and the supporting structure. Furthermore, the number of segments according to the present invention is relatively great, which means that each segment has a small width and thus easily adapts to the form of the conveyor belt. In order also to avoid exposing the corners of the scraping face of each segment to the conveyor belt, all the segments are covered by a flexible material. In a preferred embodiment, this material is also elastic as it will thereby help to even out the differences in pressure between the different segments against the conveyor belt. In one embodiment, this can be done by the segments being cast together in a flexible and optionally elastic material. This material also has a vibration damping effect. This casting together maintains the individual segments in a position relative to each other which prevents the corners of the scraping faces from being exposed so that they can damage the conveyor belt. The whole cleaning device thus moves in one piece. This gives a more uniform scraping effect, more uniform pressure and better conformability to the conveyor belt. The solution also requires less maintenance and is easier to install.

In one embodiment, the whole of or parts of the body of the scraper segments between the scraping face and the attachment are of an elastic material so that this body itself forms the elastic attachment for the scraping face. The scraping face (the blade) and the attachment means may also be connected to an elastic support, (reinforcement or spring) the object of which is to provide at all times an optimal angle between the scraping face and the conveyor belt.

One of the essential features of the present invention is that the number of cleaning device segments is relatively great in order to adapt the cleaning device optimally to the form of the conveyor belt. By casting the segments together or covering them with a flexible and/or elastic material it is possible to cover the corners of the segments which otherwise might damage the conveyor belt. In different embodiments the number of segments is therefore preferably greater than five, more preferably the number is greater than eight, and in wider cleaning devices the number of segments is greater than twelve. In various other embodiments, the number may be even greater and it is not inconceivable that there may be embodiments where between 20 and 50 segments are cast together or covered by the flexible/elastic material.

To further optimise the adaptation of the whole belt cleaning device, two or more of the segments may have different widths. For example, areas of the cleaning device which bear against especially curved areas of the conveyor belt can be divided into more segments, i.e., the segments in this area are smaller. The attachment means may also be designed to allow pre-setting of the scraper to the curved form of the drum.

In different embodiments the scraping face is formed of—or formed with—a reinforcing material, preferably a hard material such as a carbide or other material which retains a sufficiently sharp edge to carry out an efficient cleaning operation.

Consistent with another embodiment of the present invention, there is provided a cleaning device for a conveyor belt (2) for installation essentially transverse to the longitudinal direction of the conveyor belt (2). The cleaning device comprises a supporting structure (3) adapted to hold the cleaning device in place across the conveyor belt (2), the belt scraper covering essentially the whole width of the conveyor belt (2) and consisting of a plurality of individual cleaner segments (1') each of which consists of a body (7) with a scraping face (4), which scraping face (4) rests against the conveyor belt (2), characterized in that the scraping face (4) on each of the segments (1') is elastically connected to the supporting structure (3), the number of segments (1') is relatively great and all the segments (1') are covered by a flexible material.

The cleaning device may be characterized such that the scraping face is directed towards the conveyor belt. The cleaning device may be provided with one or more adjusting devices for adapting the cleaning device to the curve of the drum. The cleaning device may be characterized such that the scraping face (4) is reinforced in the connection between the supporting structure (3) and the scraping face (4). The cleaning device may be characterized such that the scraping face (4) on each segment is connected to the supporting structure (3) by a resilient metal spring having a spring constant (k1). Further, the cleaning device may be characterized such that the scraping face (4) on each segment is connected to the supporting structure (3) by a fiber-reinforced elastic material having spring constant (k1).

The cleaning device may be characterized such that the spring constant (k) is selected so that the scraper blades have an almost ideal angle of substantially 90 degrees to the conveyor belt that is to be cleaned. The cleaning device may be characterized such that two or more of the segments (1') are connected transverse to the cleaning device to a reinforcing element having a spring constant (k2). The cleaning may be characterized such that the whole of or parts of the body (7) of the scraper segments (1) are formed of an elastic material so that it forms the elastic attachment for the scraping face. The cleaning device may be characterized such that the number of segments (1') is greater than five. Further, the cleaning device may be characterized such that the number of segments (1') is greater than eight. The cleaning device may be characterized such that the number of segments (1') is greater than twelve.

The cleaning device may be characterized such that two or more of the segments (1') have different widths. The cleaning device may be characterized such that the flexible material covering the scraper segments (1') is also an elastic material. The cleaning device may be characterized in that the scraping face (4) is formed of or with a reinforcing material. The cleaning device may be mounted in a holder where at least an area of the cleaning device is fixedly connected to the holder so that the cleaning device can be bent in that there is provided one or more adjusting devices at the underside and/or the upper side of the cleaning device which push different parts of the cleaning device against the belt.

Further, the cleaning device may be mounted in a holder where at least an area of the cleaning device is fixedly connected to the holder so that the cleaning device can be bent in that there is provided one or more adjusting devices at one of and/or both of the long sides of the cleaning device which push different parts of the cleaning device against the belt. The cleaning device may be mounted in a holder where at least an area of the cleaning device is fixedly connected to the holder so that the cleaning device can be bent in that there is provided one or more adjusting devices at one of and/or both of the long sides of the cleaning device and at the underside and/or the upper side thereof which push different parts of the cleaning device against the belt in two directions.

In the following an embodiment of a belt cleaning device according to the present invention is shown in the attached figures.

FIG. 6 is a side view of another belt scraper according to the present invention which rests against the belt on the upper side of a drum.

FIG. 7 is a front plan view of the cleaning device and the drum with belt which are shown in FIG. 6.

FIG. 8 is a schematic illustration of the cleaning device shown in FIGS. 6 and 7 equipped with an adjusting device.

FIG. 9 is a schematic illustration of the cleaning device shown in FIGS. 6 and 7 equipped with an adjusting device and having segments that have different widths.

Figure 1:
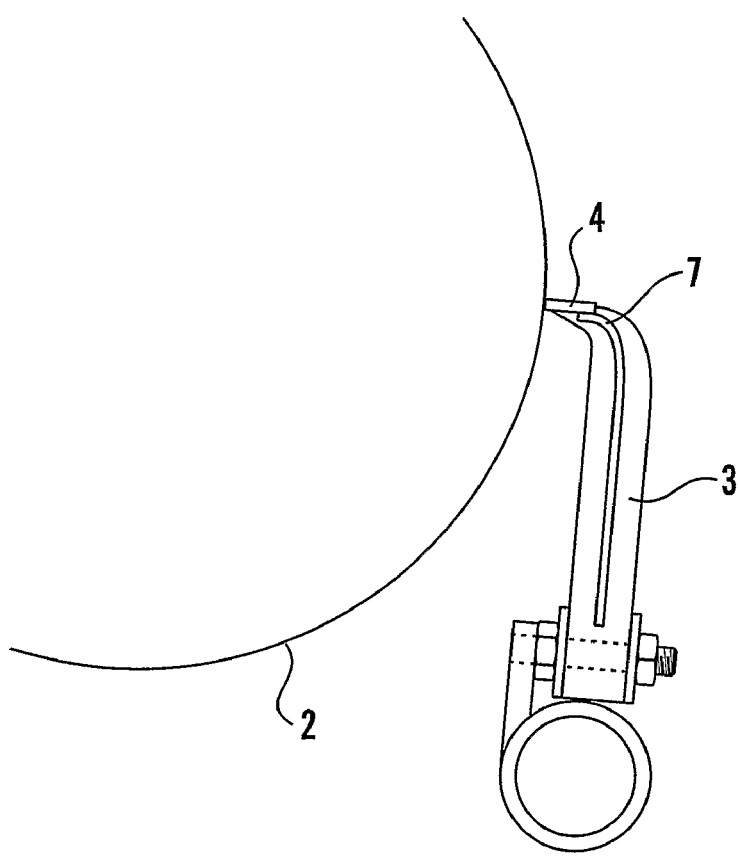
FIG. 1 is a side view of a belt scraper according to the present invention resting against a belt which runs over a drum.
Figure 2:
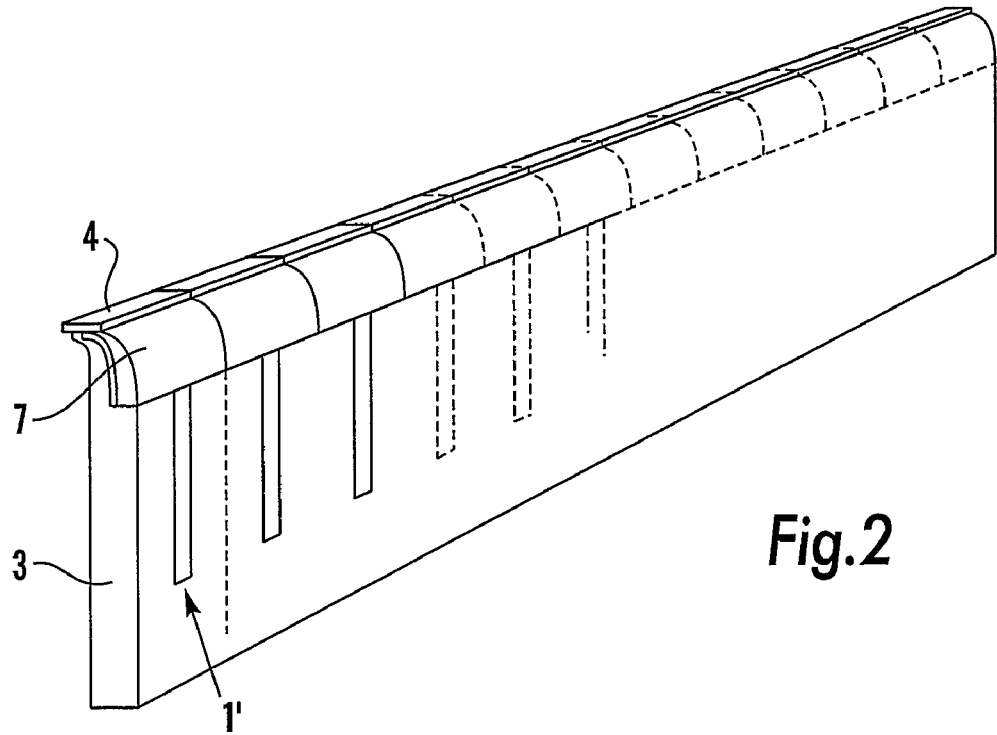
FIG. 2 is a schematic perspective view of the cleaning device as shown in FIG. 1.

FIGS. 1 and 2 show a belt cleaning device according to the present invention where a scraping face 4 is held by a body in a segment 1'. A plurality of segments form the actual cleaning device via a supporting structure 3. The supporting structure may be provided in different ways and thus obtain advantageous characteristics as is apparent from the above and from the claims.

Figure 3:
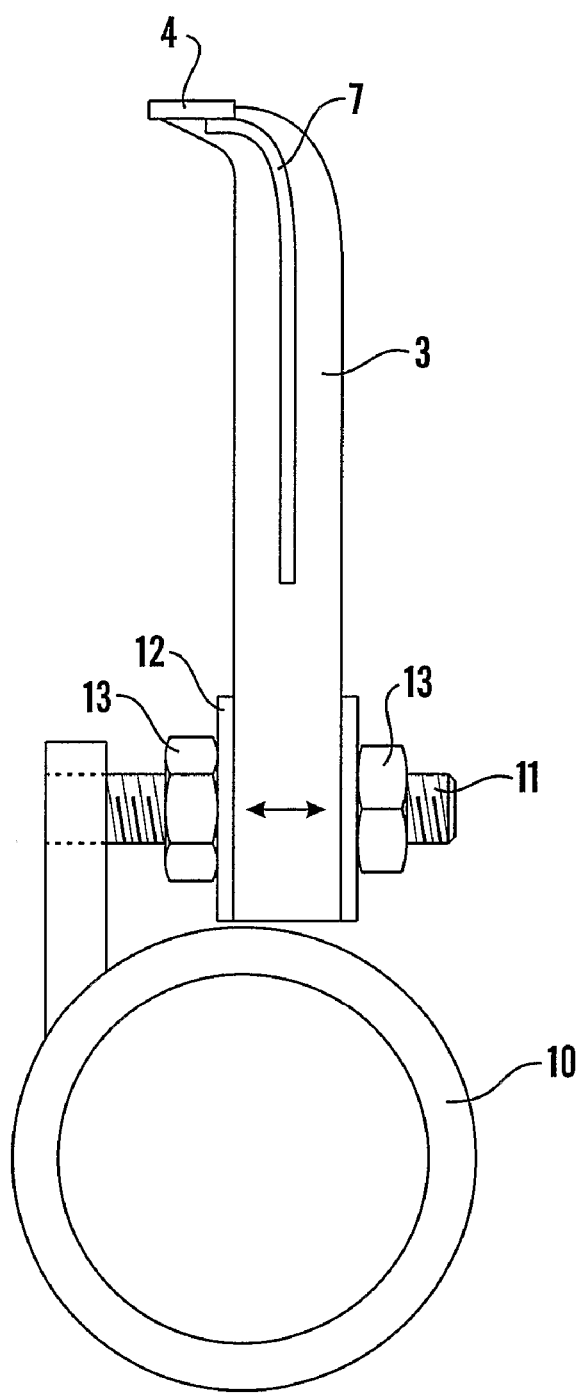
FIG. 3 shows in more detail a cleaning device according to the present invention as shown in FIG. 1.

FIG. 3 shows in further detail the same as in FIGS. 1 and 2 and in addition shows that the belt cleaning device is fitted in a holder 12 with an attachment 10. Also shown is an adjusting mechanism consisting of a through-going screw 11 with a nut 13 on each side so that the cleaning device can be moved along the through-going screw towards and away from the belt. The attachment 10 runs transverse to the belt at the point at which the cleaning device is located.

Figure 4:
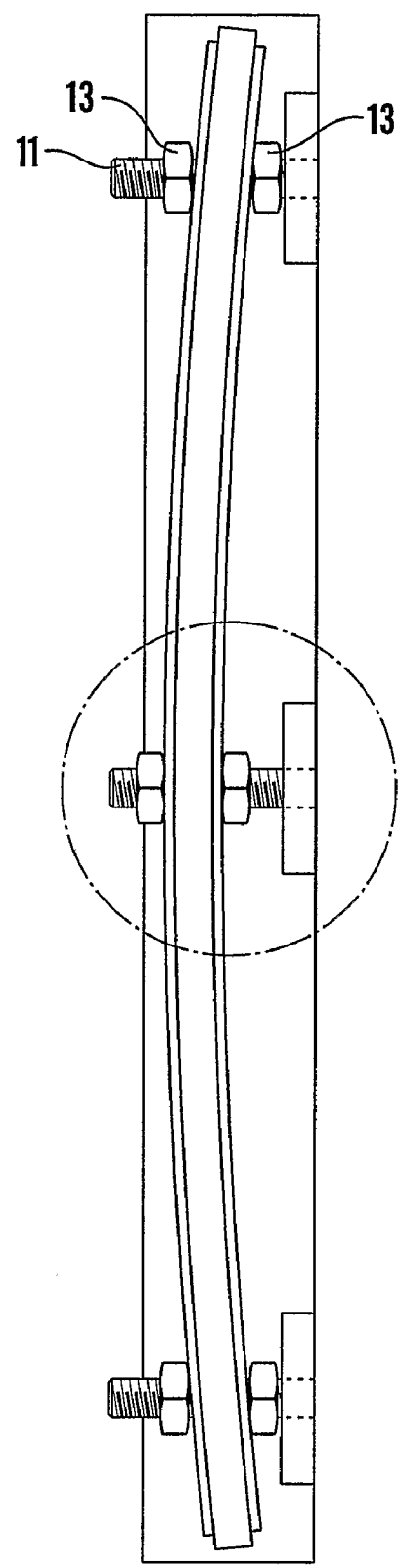
FIG. 4 is a top plan view of a cleaning device according to the present invention.
Figure 5:
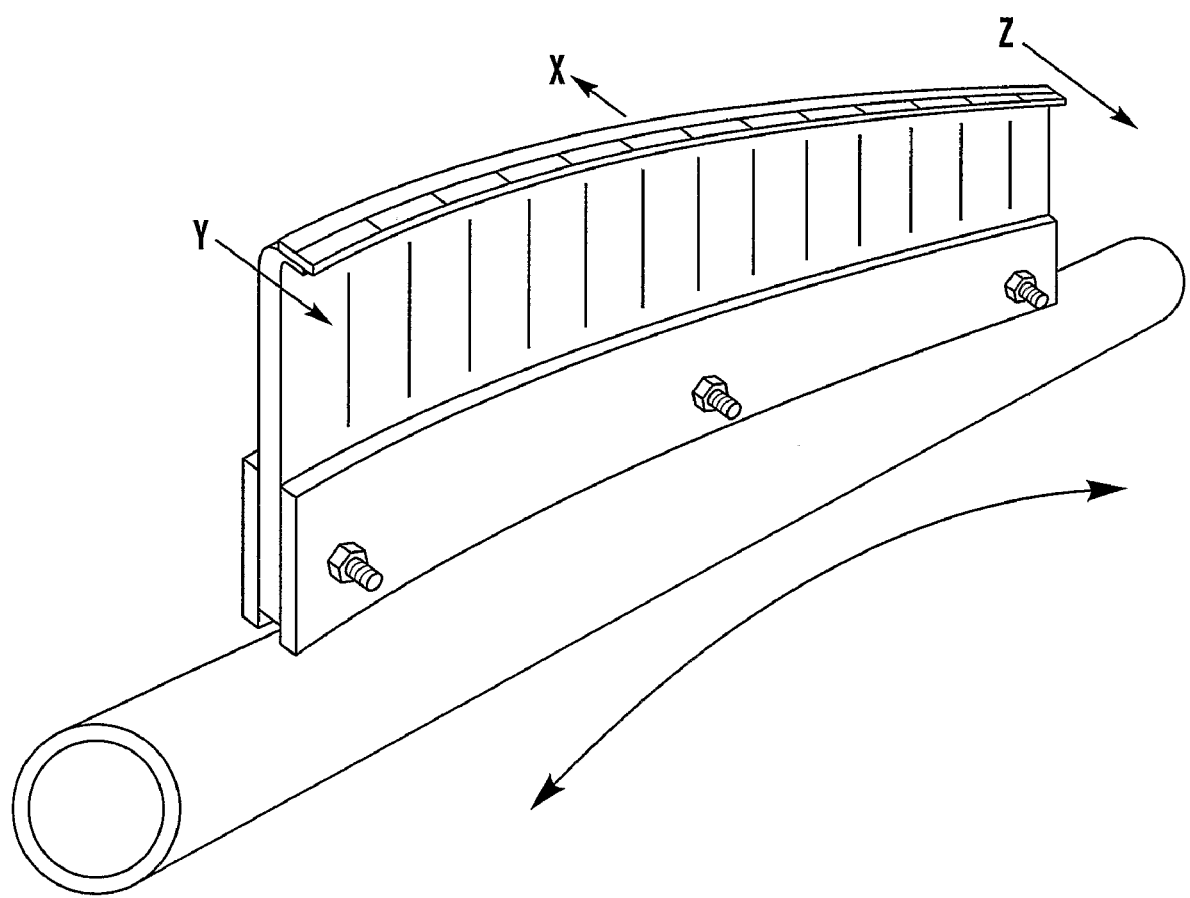
FIG. 5 shows an embodiment of a cleaning device according to the present invention with adjusting devices for adapting the form of the cleaning device to the drum and the belt.

Furthermore, in FIGS. 4 and 5 it is shown how the adjusting mechanism or the adjusting device (three adjusting devices are shown) allows the cleaning device to be given a curved form so that it is adapted to the curved form of the drum and the belt. Compared with previously known solutions, the large number of segments and the elastic attachment and the elasticity which pushes each segment against the belt will result in a much better solution that is better shaped against the belt and which provides a more uniform pressure against the belt.

FIG. 6 shows a second, alternative embodiment of the cleaning device according to the invention where the scraping face 4 is directed directly (or at a slight angle) towards the belt and where the cleaning device must therefore take up a curved form in another plane. In this embodiment the curved form is provided in that the ends of the cleaning device in particular are pushed against the belt by adjusting mechanisms or adjusting devices located on the underside of the cleaning device opposite the belt. In this case, screws 14 are used which are locked in a nut 16 and adjusted by means of a head 15 in the longitudinal direction so that it pushes against the underside of the cleaning device. The cleaning device is shown in FIG. 7 with a fixed attachment 17 in the centre of the cleaning device. This presupposes that the actual attachment of the whole cleaning device with adjusting devices can be attached with a degree of initial possible adjustment.

FIG. 8 shows in more detail and schematically a two-way adjusting device with adjusting devices on both the underside and the long side. This leaves greater room for individual adjustment to position and curved form.

FIG. 9 shows in more detail and schematically a two-way adjusting device with adjusting devices on both the underside and the long side. As is disclosed in FIG. 9, the cleaning device includes segments 20 that have different width.

The invention claimed is:

1. A scraping device for a conveyor belt for installation essentially transverse to the longitudinal direction of the conveyor belt which scraping device comprises a supporting structure adapted to hold the scraping device in place across the conveyor belt, which scraping device is covering essentially the whole width of the conveyor belt and consisting of a plurality of individual scraping segments each of which consists of a body with a scraping face, which scraping face breasts against the conveyor belt where the scraping device comprises a number of segments and the scraping face on each of the segments is individually elastically connected to the supporting structure and all the segments are covered by a flexible material, wherein the scraping device is mounted in a holder where a center area of the scraping device is fixedly connected to the holder with a fixed connection so that the scraping device can be bent toward the conveyor belt in that there is provided one or more adjusting devices on either side of said center area which push different parts of the scraping device against the conveyor belt bent around said fixed connection.

2. A scraping device according to claim 1, wherein the scraping face is directed towards the conveyor belt.

3. A scraping device according to claim 1 or 2, wherein the scraping device is provided with one or more adjusting devices for adapting the scraping device to the curve of a drum over which the conveyor belt runs.

4. A scraping device according to claim 1, wherein the scraping face is reinforced in the connection between the supporting structure and the scraping face.

5. A scraping device according to claim 1, wherein the scraping face on each segment is connected to the supporting structure by a resilient metal spring having a spring constant.

6. A scraping device according to claim 1, wherein the scraping face on each segment is connected to the supporting structure by a fibre-reinforced elastic material having a spring constant.

7. A scraping device according to claim 5 or 6, wherein the spring constant is selected so that the scraper blades have an almost ideal angle of substantially 90 degrees to the conveyor belt that is to be cleaned.

8. A scraping device according to claim 1, wherein two or more of the segments are connected transverse to the scraping device to a reinforcing element having a spring constant.

9. A scraping device according to claim 1, wherein the whole of or parts of the body of the scraper segments are formed of an elastic material so that it forms the elastic connection for the scraping face.

10. A scraping device according to claim 1, wherein the number of segments is greater than five.

11. A scraping device according to claim 1, wherein two or more of the segments have different widths.

12. A scraping device according to claim 1, wherein the flexible material covering the scraper segments is also an elastic material.

13. A scraping device according to claim 1, wherein the scraping face is formed of or with a reinforcing material.

14. A scraping device for a conveyor belt for installation essentially transverse to the longitudinal direction of the conveyor belt which scraping device comprises a supporting structure adapted to hold the scraping device in place across the conveyor belt, which scraping device is covering essentially the whole width of the conveyor belt and consisting of a plurality of individual scraping segments each of which consists of a body with a scraping face, which scraping face breasts against the conveyor belt where the scraping device comprises a number of segments and the scraping face on each of the segments is individually elastically connected to the supporting structure and all the segments are covered by a flexible material, wherein the scraping device is mounted in a holder where the scraping device is provided one or more adjusting devices which push different parts of the scraping device along the direction of movement of the conveyor belt to bend the scraping device in a curve across the width of the conveyor belt.

15. A scraping device according to claim 14, wherein the scraping face is directed towards the conveyor belt.

16. A scraping device according to claim 14 or 15, wherein the scraping device is provided with one or more adjusting devices for adapting the scraping device to the curve of a drum over which the conveyor belt runs.

17. A scraping device according to claim 14, wherein the scraping face is reinforced in the connection between the supporting structure and the scraping face.

18. A scraping device according to claim 14, wherein the scraping face on each segment is connected to the supporting structure by a resilient metal spring having a spring constant.

19. A scraping device according to claim 14, wherein the scraping face on each segment is connected to the supporting structure by a fibre-reinforced elastic material having a spring constant.

20. A scraping device according to claim 18 or 19, wherein the spring constant is selected so that the scraper blades have an almost ideal angle of substantially 90 degrees to the conveyor belt that is to be cleaned.

21. A scraping device according to claim 14, wherein two or more of the segments are connected transverse to the scraping device to a reinforcing element having a spring constant.

22. A scraping device according to claim 14, wherein the whole of or parts of the body of the scraper segments are formed of an elastic material so that it forms the elastic connection for the scraping face.

23. A scraping device according to claim 14, wherein the number of segments is greater than five.

24. A scraping device according to claim 14, wherein two or more of the segments have different widths.

25. A scraping device according to claim 14, wherein the flexible material covering the scraper segments is also an elastic material.

26. A scraping device according to claim 14, wherein the scraping face is formed of or with a reinforcing material.

27. A scraping device for a conveyor belt for installation essentially transverse to the longitudinal direction of the conveyor belt which scraping device comprises a supporting structure adapted to hold the scraping device in place across the conveyor belt, which scraping device is covering essentially the whole width of the conveyor belt and consisting of a plurality of individual scraping segments each of which consists of a body with a scraping face, which scraping face breasts against the conveyor belt where the scraping device comprises a number of segments and the scraping face on each of the segments is individually elastically connected to the supporting structure and all the segments are covered by a flexible material, wherein the scraping device is mounted in a holder where a center area of the scraping device is fixedly connected to the holder with a fixed connection so that the scraping device can be bent toward the conveyor belt in that there is provided one or more adjusting devices on either side of said center area which push different parts of the scraping device against the conveyor belt bent around said fixed connection and the scraping device is provided one or more adjusting devices which push different parts of the scraping device along the direction of movement of the conveyor belt to bend the scraping device in a curve across the width of the conveyor belt.

28. A scraping device according to claim 27, wherein the scraping face is directed towards the conveyor belt.

29. A scraping device according to 27 or 28, wherein the scraping device is provided with one or more adjusting devices for adapting the scraping device to the curve of a drum over which the conveyor belt runs.

30. A scraping device according to claim 27, wherein the scraping face is reinforced in the connection between the supporting structure and the scraping face.

31. A scraping device according to claim 27, wherein the scraping face on each segment is connected to the supporting structure by a resilient metal spring having a spring constant.

32. A scraping device according to claim 27, wherein the scraping face on each segment is connected to the supporting structure by a fibre-reinforced elastic material having a spring constant.

33. A scraping device according to claim 31 or 32, wherein the spring constant is selected so that the scraper blades have an almost ideal angle of substantially 90 degrees to the conveyor belt that is to be cleaned.

34. A scraping device according to claim 27, wherein two or more of the segments are connected transverse to the scraping device to a reinforcing element having a spring constant.

35. A scraping device according to claim 27, wherein the whole of or parts of the body of the scraper segments are formed of an elastic material so that it forms the elastic connection for the scraping face.

36. A scraping device according to claim 27, wherein the number of segments is greater than five.

37. A scraping device according to claim 27, wherein two or more of the segments have different widths.

38. A scraping device according to claim 27, wherein the flexible material covering the scraper segments is also an elastic material.

39. A scraping device according to claim 27, wherein the scraping face is formed of or with a reinforcing material.

\* \* \* \* \*